United States Patent
Neal, Jr. et al.

(10) Patent No.: US 7,946,607 B1
(45) Date of Patent: May 24, 2011

(54) SYSTEM FOR ATTACHING A TREE STAND TO AN ATV

(76) Inventors: Joseph T. Neal, Jr., Milton, FL (US); Eric Malone, Seminole, AL (US)

( * ) Notice: Subject to any disclaimer, the term of this patent is extended or adjusted under 35 U.S.C. 154(b) by 0 days.

(21) Appl. No.: 12/455,270

(22) Filed: May 28, 2009

(51) Int. Cl.
*B60D 1/14* (2006.01)

(52) U.S. Cl. .................. 280/495; 280/502; 182/63.1

(58) Field of Classification Search ............. 280/495, 280/494, 498, 502, 499, 500; 182/127, 63.1
See application file for complete search history.

(56) References Cited

U.S. PATENT DOCUMENTS

| | | | |
|---|---|---|---|
| 2,338,955 A * | 1/1944 | Metcalf .................. 414/462 |
| 3,282,375 A * | 11/1966 | Ray .................. 182/16 |
| 3,473,627 A | 10/1969 | Repka |
| 4,045,040 A | 8/1977 | Fails |
| 4,428,456 A | 1/1984 | Rohde |
| 4,442,919 A | 4/1984 | Fulcher |
| 4,696,374 A * | 9/1987 | Hale .................. 182/127 |
| 5,195,611 A | 3/1993 | Untz |
| D335,188 S | 4/1993 | Rosser |
| 5,236,062 A | 8/1993 | Laney |
| 5,295,555 A * | 3/1994 | Strange .................. 182/2.5 |
| 5,409,081 A * | 4/1995 | Reeves .................. 182/63.1 |
| D359,133 S | 6/1995 | Dull et al. |
| 5,433,291 A | 7/1995 | Shoestock, Sr. |
| 5,566,780 A * | 10/1996 | Bambrough .................. 182/116 |
| 5,642,844 A | 7/1997 | Rector |
| 5,816,462 A * | 10/1998 | Brantley .................. 224/570 |
| 5,839,538 A | 11/1998 | Magyar |
| 6,186,271 B1 | 2/2001 | Borries et al. |
| 6,254,117 B1 * | 7/2001 | Cross .................. 280/401 |
| 6,347,684 B1 | 2/2002 | Fath et al. |
| 6,460,887 B2 * | 10/2002 | Tremblay .................. 280/769 |
| 6,550,575 B2 | 4/2003 | Spencer et al. |
| 6,732,892 B1 * | 5/2004 | Mangrum .................. 224/401 |
| D519,647 S * | 4/2006 | Watson .................. D25/62 |
| 7,168,521 B1 * | 1/2007 | Murray .................. 182/127 |
| 7,185,737 B2 | 3/2007 | Smith et al. |
| 7,293,951 B2 * | 11/2007 | Meeks .................. 414/462 |
| 7,296,959 B2 * | 11/2007 | Davis .................. 414/462 |
| 7,320,382 B2 * | 1/2008 | Savoie et al. .................. 182/127 |
| 2002/0179369 A1 * | 12/2002 | Wallace .................. 182/63.1 |
| 2003/0000769 A1 * | 1/2003 | Pyle .................. 182/63.1 |
| 2009/0229914 A1 * | 9/2009 | Liles .................. 182/63.1 |

* cited by examiner

*Primary Examiner* — Paul N Dickson
*Assistant Examiner* — Tashiana Adams
(74) *Attorney, Agent, or Firm* — Peter Loffler

(57) ABSTRACT

A system attaches a hunter's tree stand to an ATV in order to allow the ATV to easily tow the tree stand. A bracket is removably attached to the rear deck of the ATV, the bracket having a receiver/. A coupler is removably attached to the tree stand and is removably received within the receiver, the coupler being able to pivot both up and down and side to side. A pair of wheels are each attached to a respective one of the bottom of the legs of the tree stand.

9 Claims, 5 Drawing Sheets

SYSTEM FOR ATTACHING A TREE STAND TO AN ATV

BACKGROUND OF THE INVENTION

1. Field of the Invention

The present invention relates to a kit that is removably attachable to a hunter's tree stand, bind, or other accessory, in order to allow the attached to device to be transported in the field by an ATV.

2. Background of the Prior Art

A hunter's tree stand is standard equipment for many hunters. The tree stand is brought to a desired location, is set up, and is used by the hunters to wait for the prey. The problem with the hunters tree stand is its size. Even relatively small and collapsible tree stands are relatively bulky and difficult to transport, especially on hilly terrain or in a dense forest. Accordingly, many hunters rely on transporting the tree stand via an ATV (All Terrain Vehicle) which can easily carry the tree stand between truck and hunting location. While an ATV can carry all but the most massive tree stands, use of the ATV is not without its drawbacks. Loading the tree stand and securing it onto the ATV can be a challenge in itself. As a typical ATV has a forward rack and a rear rack, each of which are relatively small, even a modest sized tree stand be difficult to secure thereon. Additionally, after the hunt, the racks tend to be used for the felled game, in addition to other hunting gear, so that no room exists upon where the tree stand can be secured. This often results in the need to make two trips between hunting ground and truck, which can be quite onerous when the two are located a fair distance apart. Often, due to its size, the tree stand must be loaded transversely to the ATV's longitudinal axis. As a result, the tree stand protrudes out from the sides of the vehicle so that the ATV is limited in its maneuverability through the forest.

To address such problems, tow vehicles have been proposed wherein the tree stand is towed behind the ATV dispensing with the bulky loading process and freeing the tie down racks for other equipment and game. However, such tow vehicles are themselves bulky so that transport space on the truck, which is already transporting the ATV, can be problematic. Additionally, such tow vehicles tend to be relatively complex in design and construction making such devices relatively expensive to purchase.

What is needed is a device that allows a hunter to use his or her ATV to transport a tree stand while addressing the above stated drawbacks. Such a device must allow for quick and easy attachment of the tree stand to the ATV without significantly diminishing the carrying capacity of the ATV and without unduly limiting the ATV's maneuverability, especially in dense topography. Such a device must be of relatively simple design and construction so as to be relatively inexpensive to produce so as to be economical for potential purchasers of such a device.

SUMMARY OF THE INVENTION

The system for attaching a tree stand to an ATV of the present invention addresses the aforementioned needs in the art by allowing a hunter to be able to easily tow a tree stand behind the ATV without the need for difficult and time-consuming loading of the tree stand directly onto the vehicle. The system for attaching a tree stand to an ATV has minimal impact on the load carrying capacity of the racks of the ATV and does not cause the tree stand to protrude out the sides of the ATV. The system for attaching a tree stand to an ATV is simple in design and construction so that it is relatively inexpensive to produce. Attachment of the system for attaching a tree stand to an ATV to the tree stand and to the ATV and detachment therefrom, is relatively simple and can be accomplished very quickly without the need for specialized tools.

The system for attaching a tree stand to an ATV of the present invention is comprised of a bracket that is attached to the rear rack of the ATV. The bracket has a receiver extending rearwardly. A coupling bar is attached to the tree stand and is removably receivable within the receiver. A pair of wheels is provided such that each wheel is removably attached to a respective one of the legs of the tree stand. The coupling bar is capable of pivoting up and down as well as from side to side with respect to the tree stand. The coupling bar is attached to the tree stand via a pair of tree stand brackets that are each removably attached to the deck and where an attachment bar is pivotally attached to the pair of tree stand brackets and the coupling bar is pivotally attached to the attachment bar. The coupling bar curves upwardly in extending from rearwardly the receiver. The bracket is attached to the rack via a series of U-bolts.

BRIEF DESCRIPTION OF THE DRAWINGS

Similar reference numerals refer to similar parts throughout the several views of the drawings.

DESCRIPTION OF THE PREFERRED EMBODIMENT

Figure 1:
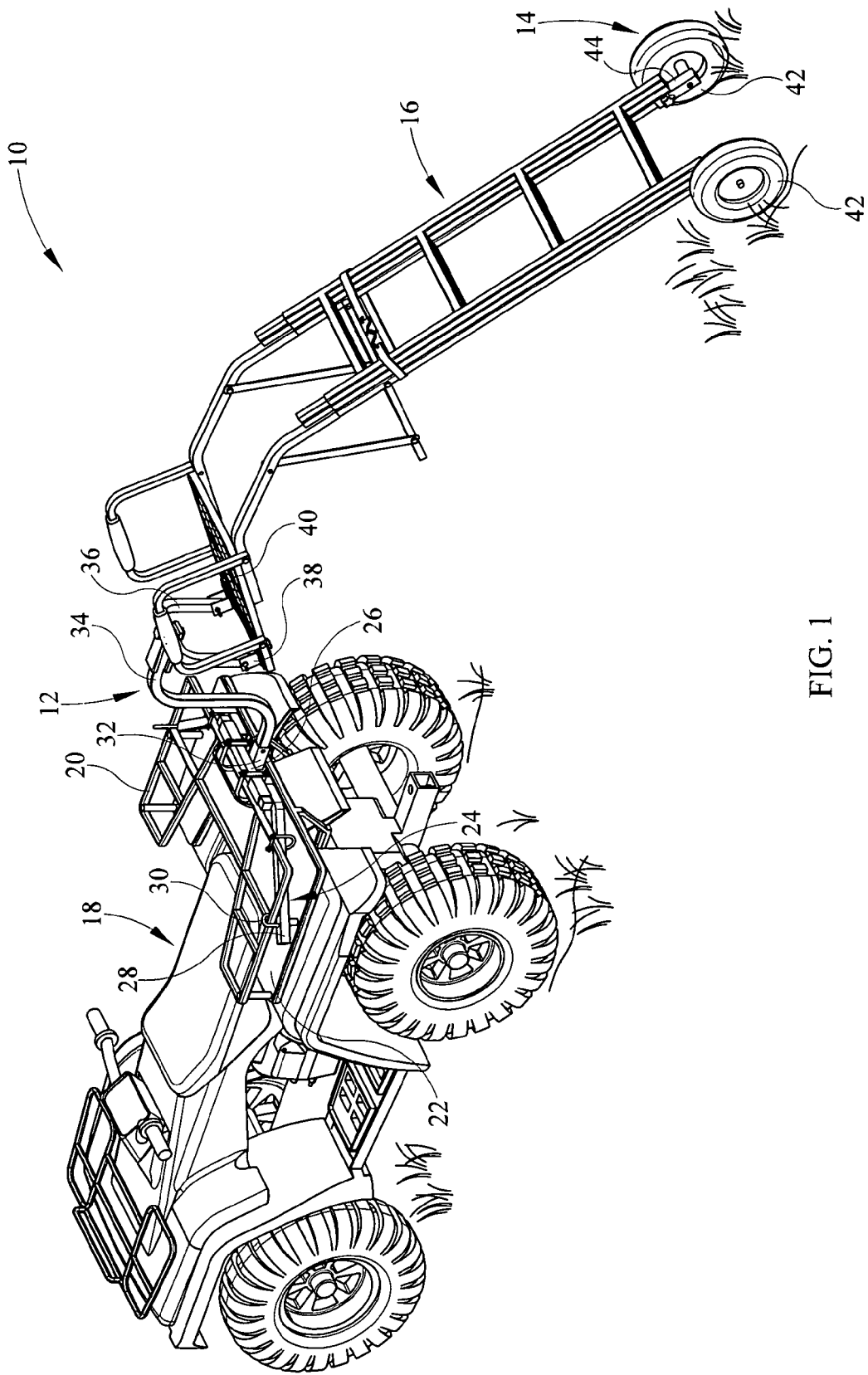
FIG. 1 is a perspective view of the system for attaching a tree stand to an ATV of the present invention, attached to the ATV use.
Figure 2:
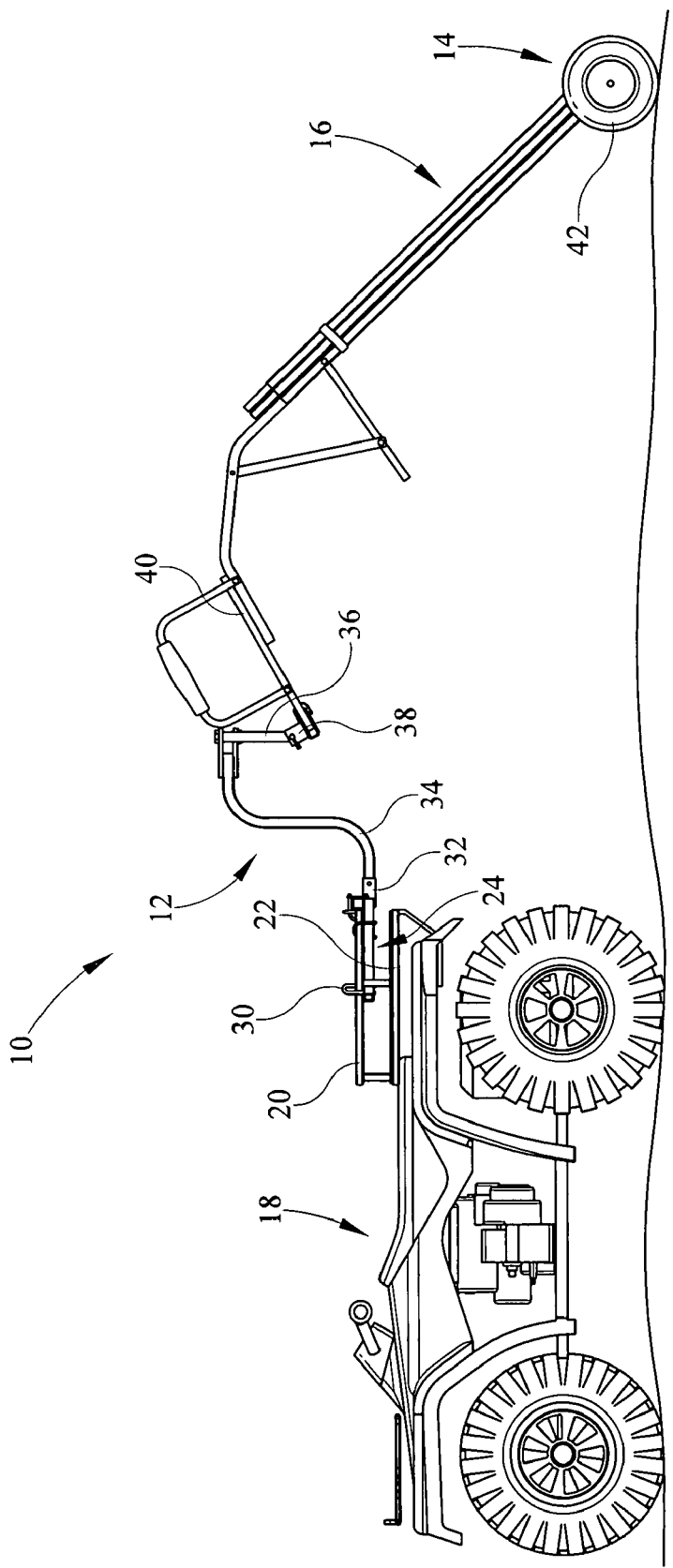
FIG. 2 is a side elevation view of the system for attaching a tree stand to an ATV attached to the ATV.
Figure 3:
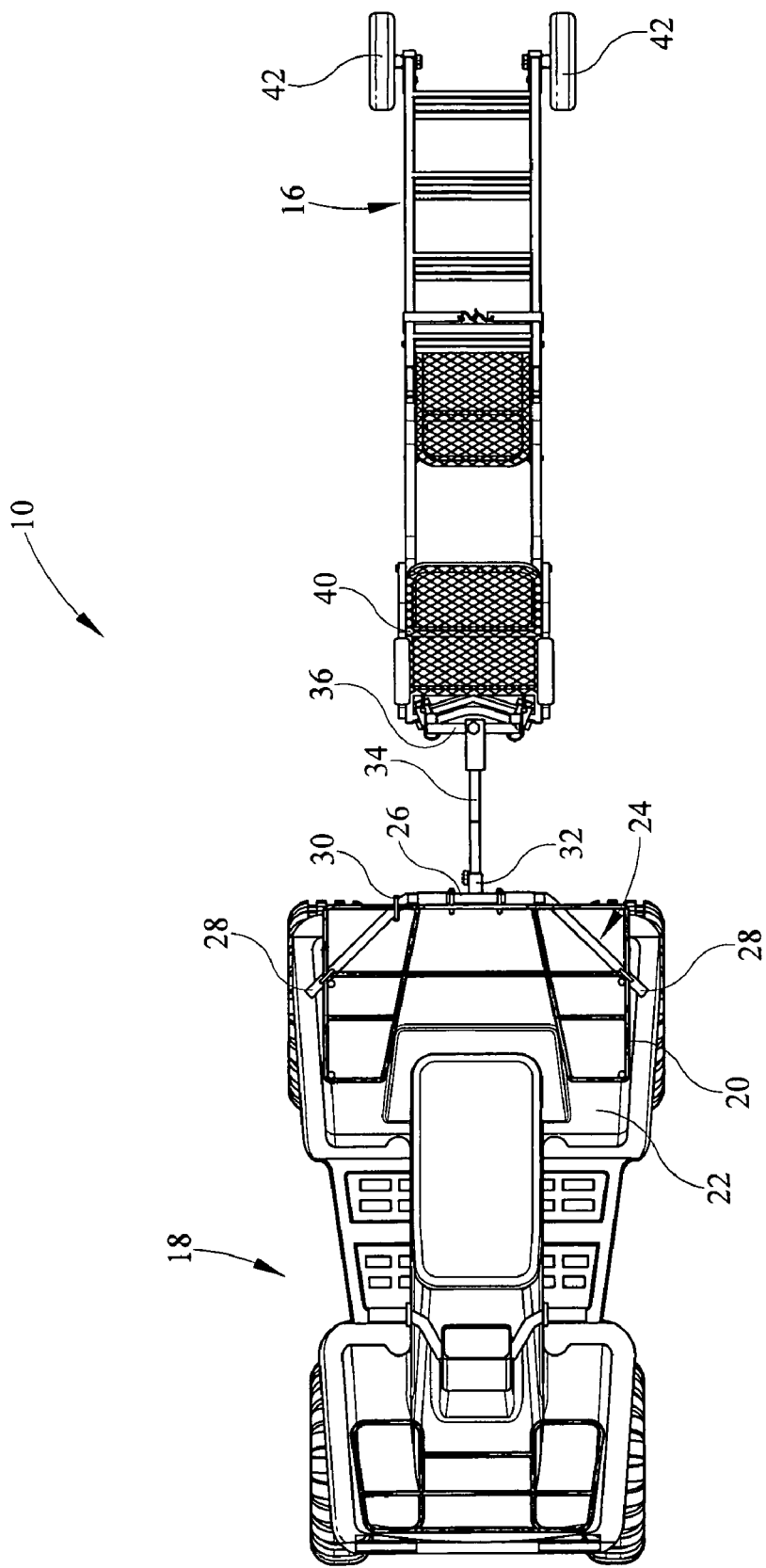
FIG. 3 is a top plan view of the system for attaching a tree stand to an ATV attached to the ATV.
Figure 4:
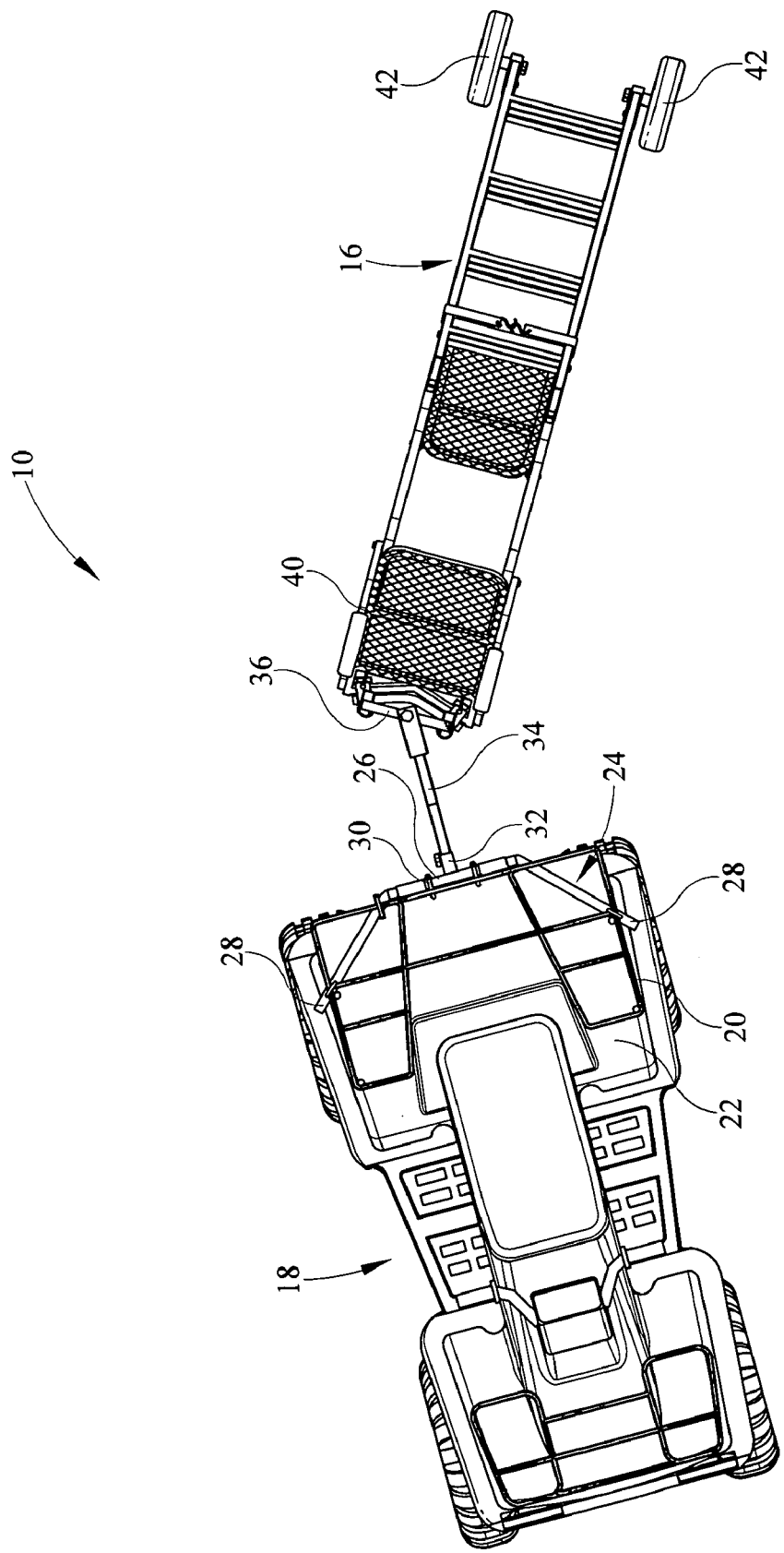
FIG. 4 is a top plan view of the system for attaching a tree stand to an ATV attached to the ATV with the ATV executing a turn to illustrate the articulation of the coupling.
Figure 5:
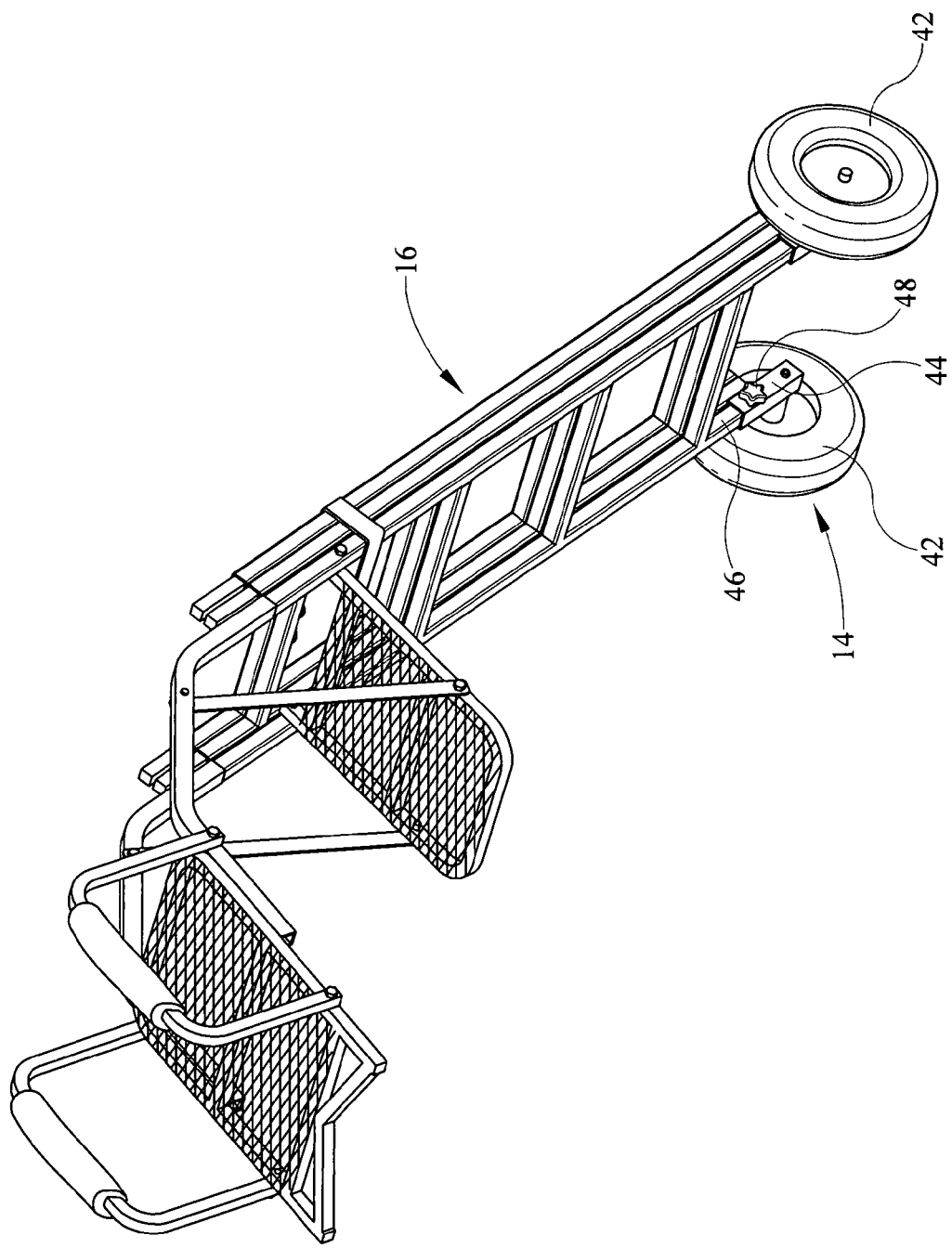
FIG. 5 is a perspective view of the tree stand uncoupled from the ATV.

Referring now to the drawings, it is seen that the system for attaching a tree stand to an ATV of the present invention, generally denoted by reference numeral 10, is comprised of a coupling system 12 and a wheel system 14. The coupling system 12 is used to attach the tree stand 16 to an ATV 18. As seen, the ATV 18 has a rack 20 that extends up from the back deck 22 of the vehicle 18. A bracket 24 has a central leg 26 and a pair of opposing diagonally disposed side legs 28 that each extend out from the central leg 26 at approximately a 45 degree angle, although higher or lower angles can also be employed. The side legs 28 can be separate entities that are each attached to the central leg 26 in any appropriate fashion, as illustrated, or the bracket 24 may be formed as a single unitary bar with the side legs 28 each bent out to the desired angle. The bracket 24 is held to the underside of the rack 20 via a series of U-bolts 30. A square hitch receiver 32 extends rearwardly from the center leg 26.

A coupling bar 34 is removably receivable within the square hitch receiver 32 and held thereat in appropriate fashion, the coupling bar 34 curving upwardly in proceeding away from the receiver 32. The opposing end of the coupling bar 34 is pivotally attached to an inverted U-shaped attachment bar 36, the pivot articulation being generally side to side. The ends of the attachment bar 36 are each pivotally attached to a tree stand bracket 38, wherein each tree stand bracket 38 is removably attached to the upper deck 40 of the tree stand 16 in appropriate fashion (bolts, etc.,) and in spaced apart configuration. The pivot articulation for attachment bar 36 to tree stand bracket 38 is generally up and down.

As seen, the wheel system 14 comprises a pair of wheels 42 (which may be hard rubber, pneumatic, etc.,) which are each axlely attached to a tree stand receiver 44, each receiver 44 having a generally rectangular-shaped cross-section (or other appropriate cross-section) that corresponds to the shape of the bottom legs 46 of the tree stand 16 and has a hollow interior. Each tree stand receiver 44 receives a respective one of the legs 46 of the tree stand 16 and once so received, a compression knob 48 on the tree stand receiver 44 is tightened in order to hold each leg 46 firmly within its respective tree stand receiver 44.

In order to use the system for attaching a tree stand to an ATV 10 of the present invention, each wheel 42 is attached, via its wheel receivers 44, to its respective leg 46 as described. The attachment brackets 38 are attached to the upper deck 40 of the tree stand 16. The bracket 24 is attached to the rack 20 of the ATV. The distal end of the coupling bar 34 is received within the square hitch receiver 32 and secured therein. The ATV 18 and the attached tree stand 16 are now ready to proceed to the hunting grounds. The up and down pivotal attachment of the attachment bar 36 to tree stand bracket 38 allows the tree stand 16 to articulate up and down as the ATV 18 and tree stand 16 travel over uneven terrain. The side to side pivotal attachment of the coupling bar 34 to attachment bar 36 allows the ATV 18 to be able to properly take turns without dragging the tree stand 16 through such turns, the tree stand 16 following the ATV 18 appropriately. Once at the desired location, the coupling bar 34 is removed from the square hitch receiver 32. If desired, a user can roll the tree stand 16 to its final destination simply by grabbing the end of the coupling bar 36 and pulling the tree stand 16 along. Once the tree stand 16 is at the desired hunting location (or storage at the end of the day), the compression knobs 48 are counter-rotated so as to allow the legs 46 to be removed out of the receivers 44. The tree stand brackets 38 are removed from the deck 40 of the tree stand 16 and the tree stand 16 is used as desired. The ATV 18 is free to perform other desired tasks. The bracket 24 may but need not be removed from the rack 20 of the ATV 18 depending on the needs of the ATV 18 for the user. When not is use, the various components of the system 10 may remain on the ATV 18 or tree stand 16 as appropriate, or may be removed therefrom for relatively compact storage, the removal being relatively quick from both ATV 18 and tree stand 16.

While the invention has been particularly shown and described with reference to an embodiment thereof, it will be appreciated by those skilled in the art that various changes in form and detail may be made without departing from the spirit and scope of the invention.

We claim:

1. An attachment system for attaching a hunting device to an ATV, the hunting device having a deck and a pair of coextensive legs, each leg having a first shape, the ATV having a rack extending from a rear deck thereof, the attachment system comprising:
   a bracket adapted to be attached to the rack, the bracket having a hitch receiver extending rearwardly;
   a generally S-shaped coupling bar having a first end that is removably receivable within the hitch receiver, the coupling bar also having a second end;
   a generally inverted U-shaped attachment bar pivotally attached to the second end of the coupling bar such that the attachment bar is capable of pivoting from side to side with respect to the coupling bar;
   a pair of attachment brackets pivotally attached to the attachment bar and adapted to be attached to the hunting device such that each of the attachment brackets is capable of pivoting up and down with respect to the attachment bar; and
   a pair of wheels, each wheel adapted to be removably attached to a respective one of the legs of the hunting device.

2. The attachment system as in claim 1 wherein the coupling bar curves upwardly in extending from the receiver.

3. The attachment system as in claim 1 wherein the bracket is attached to the rack via a series of U-bolts.

4. The attachment system as in claim 1 in combination with the ATV and the hunting device.

5. The attachment system as in claim 4 wherein the coupling bar curves upwardly in extending from the receiver.

6. The attachment system as in claim 4 wherein the bracket is attached to the rack via a series of U-bolts.

7. The attachment system as in claim 4 wherein the hunting device is a tree stand.

8. The attachment system as in claim 1 further comprising a pair of receivers, each receiver attached to a respective one of the pair of wheels, each receiver having a hollow interior that has a second shape, which second shape corresponds to the first shape of the legs such that each leg is removably received within the hollow interior of a respective one of the receivers.

9. The attachment system as in claim 4 further comprising a pair of receivers, each receiver attached to a respective one of the pair of wheels, each receiver having a hollow interior that has a second shape, which second shape corresponds to the first shape of the legs such that each leg is removably received within the hollow interior of a respective one of the receivers.

* * * * *